United States Patent
Kosted

(12) 
(10) Patent No.: US 6,943,314 B2
(45) Date of Patent: Sep. 13, 2005

(54) METHOD FOR PRODUCING A DOUBLE-SIDED RABIES I.D. TAG

(76) Inventor: Dale Kosted, 3502 King St., Enid, OK (US) 73703

( * ) Notice: Subject to any disclaimer, the term of this patent is extended or adjusted under 35 U.S.C. 154(b) by 49 days.

(21) Appl. No.: 10/683,833

(22) Filed: Oct. 10, 2003

(65) Prior Publication Data

US 2005/0077721 A1 Apr. 14, 2005

(51) Int. Cl.[7] ................................................ B23H 1/00
(52) U.S. Cl. ...................... 219/68; 40/303; 219/121.69; 409/84
(58) Field of Search ........................... 409/84, 88, 131, 409/132; 40/303, 300; 119/858; 219/68, 121.69

(56) References Cited

U.S. PATENT DOCUMENTS 1,803,196 A * 4/1931 Mader ......................... 40/303
2,854,560 A * 9/1958 Hill ............................ 219/69.1
5,569,003 A * 10/1996 Goldman et al. ............ 409/132

FOREIGN PATENT DOCUMENTS

| GB | 2284404 A | * | 6/1995 | ............. G09F/3/02 |
| JP | 8-131008 A | * | 5/1996 | |
| JP | 2002-95509 A | * | 4/2002 | |

* cited by examiner

*Primary Examiner*—Geoffrey S. Evans

(57) ABSTRACT

A method for making a double sided, metal Rabies I.D. tag with an electronic engraving machine capable of inscribing data on both sides such as one side of the I.D. tag has inscribed personal contact information along with the name of the pet, and the other side has inscribed the rabies vaccination information.

1 Claim, No Drawings

METHOD FOR PRODUCING A DOUBLE-SIDED RABIES I.D. TAG

FIELD OF THE INVENTION

The present invention relates generally to pet identification devices, and, more particularly to a method for making a double sided, metal Rabies I.D. tag in an electronic engraving machine capable of inscribing data on both sides such as one side of the I.D. tag has inscribed personal contact information along with the name of the pet, and the other side has inscribed the rabies information.

BACKGROUND OF THE INVENTION

Many identification devices have been designed with various functions to aid in the retrieval of a lost pet, and they have been widely described in the Prior Art. See for example U.S. Pat. Nos. 6,502,060; 6,283,065; 6,003,473; 5,752,335; 5,690,365; 5,355,839; 4,137,660; 4,091,766; 3,805,427; 3,585,743; 3,020,658; 2,893,143; 2,255,99; 1,657,250. The above patents, in some cases, disclose pet identification tags or systems which solve the problem of identifying a lost pet and fail to disclose pertinent Rabies vaccination information especially if the lost pet has bitten, scratched, or endangered the life of a human. And, even though the animal's owner can be located through their use the animal still must be impounded by authorities for a period of time until necessary medical information of the pet can be determined by veterinary records to determine if the pet is safe to release to the owner. Or, the patents above which can electronically record such data are so expensive that pet owners are not willing to purchase them for their pets. And, the problem in general, with standard Rabies tags most veterinary clinics issue, which come in an agreed upon shape for that particular year, is that there is not enough room on the tag to inscribe personal information along with vaccination data. Nor, are most Veterinarians skilled with the precision of jewelry craftsmen in inscribing words on metal tags, are due to the lack of this skill it was impractical if not impossible for Veterinarians or their assistants to conceive of attempting such a feat. And, due to a lack of skill and sophistication in the use engraving tools, Veterinarians and their assistants would not attempt such an inscription. Therefore, veterinary clinics have relied upon purchasing pre-stamped, with an identification code, metal Rabies tags from which they can record the name of the pet and the Rabies vaccination in a computer, book, or journal. And, sometimes this recorded information is the only means of identifying for the owner a pet if it becomes lost. Often, veterinary clinics are burdened by the costs of purchasing more pre-stamped metal tags than they will issue for a given year.

The present invention provides a method for making a double sided, metal Rabies I.D. tag with an electronic engraving machine capable of inscribing data on both sides whereby one side of the I.D. tag has inscribed personal contact information along with the name of the pet, and the other side has inscribed the rabies vaccination information. And, the cost of such an I.D. tag made using the present invention is very inexpensive to the pet owner making it a very desirable option.

Those skilled in the prior art of electronic reproduction technology have limited its use to inscribing jewelry, novelty tags, and trinkets, being totally unaware of its potential use in the field of veterinary medicine. And, any method for producing a double sided, metal Rabies identification tag has been unknown to those skilled in the prior art.

SUMMARY OF THE INVENTION

An object of the present invention is to provide a method for producing a double sided, metal Rabies I.D. tag, whereby a Veterinarian or veterinarian assistant can easily inscribe both sides of a blank metal tag using a programmed computer system with a keyboard connected to an electronic engraving machine capable of such a task.

DETAILED DESCRIPTION OF THE INVENTION

The programmed computer system stores all pertinent Rabies data and ID tag numbers issued so that data does not have to be re-entered for each new ID tag, and the new ID tag is made with the next sequential number in the series. The method of the present invention solves the following problems that are encountered daily in veterinarian clinics: 1.) the decision to ID tag a pet becomes a very passive decision in that the pet's owner can receive the ID tag immediately and does not have to wait for several days for an ID tag to be shipped off to a company to be inscribed and returned in the mall before afixing it to their pet's collar. 2.) a pet does not have to wear additional tags for identification that jangle together causing a noise problem for the pet's owner. 3.) when a lost pet is found tracing its owner can be accomplished in a relatively short time by simply using the contact information on the reverse side of the ID tag to reunite the pet with its owner instead of having to research the Rabies data on tag and sourcing out the pet's owner which can take several hours. 4.) Veterinarians can inscribe a blank ID tag on a per need basis and do not have a costly supply of pre-ordered ID tags left over at the end of the year.

The Humane Association did a study showing that animals with a metal ID tag resulted in a 90% return rate.

I claim:

1. A method for making a double sided, metal Rabies I.D. tag in an electronic engraving machine capable of inscribing data on both sides whereby one side of the I.D. tag has inscribed personal contact information along with the name of the pet, and the other side has inscribed the Rabies information comprising the following steps:

Step 1: Tell the electronic engraving machine which style of blank tag the user chooses to engrave;

Step 2: Type the information the user chooses to appear on one side of the tag;

Step 3: Place the blank tag in the tag holder and check the text that appears on the screen of the electronic engraving machine for accuracy and press the enter key;

Step 4: Wait a few seconds while the electronic engraving machine inscribes the Rabies data on the first side of the ID tag;

Step 5: When finished engraving remove the ID tag and turn the ID tag over so that the other side can be inscribed with the desired personal data;

Step 6: Follow Steps 1–4 for engraving the other side;

Step 7: Remove the ID tag which has been successfully inscribed on both sides.

* * * * *